United States Patent [19]
Goda et al.

[11] Patent Number: 5,766,756
[45] Date of Patent: Jun. 16, 1998

[54] MAGNETIC RECORDING MEDIUM FOR LONGITUDINAL RECORDING AND METHOD OF MANUFACTURING THE SAME

[75] Inventors: Noriyoshi Goda; Shinji Fukaya; Naoto Endo, all of Odawara, Japan

[73] Assignee: Hitachi, Ltd., Tokyo, Japan

[21] Appl. No.: 603,163

[22] Filed: Feb. 20, 1996

[30] Foreign Application Priority Data

Feb. 21, 1995 [JP] Japan .................. 7-031987

[51] Int. Cl.$^6$ .................................................. G11B 5/66
[52] U.S. Cl. ............. 428/332; 428/336; 428/694 T; 428/694 TS; 428/694 TK; 428/900; 204/192.2
[58] Field of Search ............... 428/694 T, 694 TS, 428/694 TK, 336, 332, 900; 204/192.2

[56] References Cited

U.S. PATENT DOCUMENTS

| | | | |
|---|---|---|---|
| 4,654,276 | 3/1987 | Ahlert | 428/641 |
| 4,842,917 | 6/1989 | Ohno | 428/141 |
| 4,894,133 | 1/1990 | Hedceoth | 204/192.15 |
| 5,569,533 | 10/1996 | Lal | 428/332 |

FOREIGN PATENT DOCUMENTS

| | | |
|---|---|---|
| 59-88806 | 5/1984 | Japan . |
| 1-237925 | 9/1989 | Japan . |

OTHER PUBLICATIONS

Abstract of Meeting of Japan Society of Applied Magnetism, Nov. 1989, p. 13.

IEEE Transactions on Magnetics, vol. 26, No. 5, Sep. 1990, "Signal to Noise Ratio of Thin Film Disks With Various Orientation Ratios", M. Mirzamaani et al, pp. 2457-2459.

IEEE Transactions on Magnetics, vol. 24, No. 6, Nov. 1988, "Dependence of Magnetics, Microstructures and Recording Properties on Underlayer Thickness in CoNiCr/Cr Media", T. Yogi et al, pp. 2727-2729.

*Primary Examiner*—Leszek Kiliman
*Attorney, Agent, or Firm*—Fay,Sharpe,Beall,Fagan,Minnich & McKee

[57] ABSTRACT

A magnetic recording medium for longitudinal recording uses a non-magnetic substrate made of glass ceramics that is suitable for high density recording with low noise. The magnetic recording medium is obtained by forming a magnetic recording film mainly containing cobalt on a non-magnetic glass substrate through a non-magnetic underlaying film made of Cr. Further a non-magnetic covering film is formed thereon. With respect to the crystal orientation of the faces of cobalt measured by X-ray diffraction, the diffraction intensity of the (0002) face is 1.5 times or more and 8 times or less the total diffraction intensities of the other faces.

16 Claims, 4 Drawing Sheets

MAGNETIC RECORDING MEDIUM FOR LONGITUDINAL RECORDING AND METHOD OF MANUFACTURING THE SAME

FIELD OF THE INVENTION

The present invention relates to a magnetic recording medium for longitudinal recording such as a magnetic disk for a magnetic recording device, and a method of manufacturing the same.

BACKGROUND OF THE INVENTION

Conventionally, as magnetic recording media suitable for high density recording with low noise, there have been known types using a magnetic recording film made of CoCrPt or CoCrPtTa (disclosed in Japanese Patent Laid-open No. SHO 59-88806) (1984), and a type using a magnetic recording film made of CoNiCrTa (disclosed in Japanese Patent Laid-open No. HEI 1-237925) (1988). A technique of realizing high recording density and low noise by applying a bias to a substrate and obtaining a high coercive force has also been disclosed in Abstract of the Meeting of Japan Society of Applied Magnetism (pp. 13, issued on November, 1989). Also, IEEE Trans. Magn., Vol. 26, No. 5, 2457–2459 (1990) has described that, with respect to crystal orientation faces of Co, it is desirable that the axis of easy magnetization is parallel to a substrate for the most part and that crystals are oriented along the circumferential direction of the medium to some extent.

SUMMARY OF THE INVENTION

In the above-described prior art, the non-magnetic substrate has been made of an aluminum alloy applied with nickel-phosphorous plating. Recently, to satisfy the requirement for high density and reduction in size of magnetic recording media, the substrates have been also required to be thinned. In this regard, the aluminum substrate is disadvantageous in that as the thickness is reduced, the strength is lowered. On the other hand, a glass substrate has been known as a non-magnetic substrate. For a glass substrate, even when the thickness is reduced, the strength can be sufficiently maintained. A glass substrate, however, has a disadvantage that the magnetic recording film formed thereon is not suitable for high density recording with a low noise because it is different from that formed on the aluminum substrate in its physical behavior.

A first object of the present invention is to provide a magnetic recording medium for longitudinal recording using a non-magnetic substrate made of glass ceramics or carbon, which is suitable for high density recording with low noise.

A second object of the present invention is to provide a method of manufacturing the above-described magnetic recording medium for longitudinal recording.

To achieve the above-described first object, according to the present invention, there is provided a magnetic recording medium for longitudinal recording, including a non-magnetic substrate made of glass ceramics or carbon, and a magnetic recording film mainly containing cobalt which is formed on the non-magnetic substrate, wherein with respect to crystal orientation faces of cobalt measured by X-ray diffraction, the diffraction intensity of the (0002) face is 1.5 times or more and 8 times or less, preferably, 3 times or more and 8 times or less the total of diffraction intensities of the other Co faces, that is, the (10$\bar{1}$0) face, (11$\bar{2}$0) face and (10$\bar{1}$1) face.

The magnetic recording film is preferably formed on a non-magnetic glass substrate through a non-magnetic underlaying film made of Cr or a Cr alloy, such as alloys of Cr and Zr or V or one of the alloys CrTi, CrMo and CrW, wherein the Ti, Mo and W are present in a range of 1 to 40 at.%, and preferably one of 10, 15 or 20 at.%. The non-magnetic underlaying film is preferably formed of a plurality of layers, for example, two or three layers. In this case, respective layers may be made of the same material or different materials. In the case of the non-magnetic underlaying film formed of two layers, the thickness of each of the upper and lower layers is preferably in the range of from 1 to 100 nm, more preferably, in the range of from 1 to 50 nm; and the total thickness thereof is preferably in the range of from 1 to 100 nm.

The thickness of the magnetic recording film is preferably in the range of from 5 to 70 nm. When it is less than 5 nm, the magnetostatic characteristics tend to be lowered; while when it is more than 70 nm, the film is not suitable for high density recording. For high density recording, the mean grain size of the columnar surface on the surface of the magnetic recording film is preferably in the range of from 5 to 35 nm, more preferably, in the range of from 10 to 35 nm. The magnetic recording film may be of a multi-layer structure having a plurality of layers. In this case, a non-magnetic intermediate layer may be provided between a plurality of layers. The thickness of the non-magnetic intermediate layer is preferably in the range of from 0.5 to 10 nm, more preferably, in the range of from 2 to 5 nm.

To achieve the above-described second object, according to the present invention, there is provided a method of manufacturing a magnetic recording medium for longitudinal recording that includes forming a non-magnetic underlaying film on a non-magnetic glass substrate at room temperature, i.e. without heating the substrate; forming a second non-magnetic underlaying film on the first non-magnetic underlaying film at a temperature in the range of from 100 to 450° C. and forming a magnetic recording film on the second non-magnetic underlaying film. The heating of the substrate in forming the second non-magnetic underlaying film makes the grain size of the underlayer materials (Cr or Cr alloy) smaller thereby increasing the S/N ratio of the resultant recording medium.

The magnetic recording film of the present invention is specified such that with respect to crystal orientation faces of cobalt measured by X-ray diffraction, the diffraction intensity of the (0002) face is large. This means that crystals are oriented in the vertical direction. In the magnetic recording medium for high density recording using a disk made of glass with no orientation in the circumferential direction, for the purpose of reducing noise, it is desirable that relatively many crystals are oriented in the vertical direction, and more preferably, a mean grain size of the columnar surface is small to some extent.

DETAILED DESCRIPTION OF THE PREFERRED EMBODIMENTS

Figure 1:
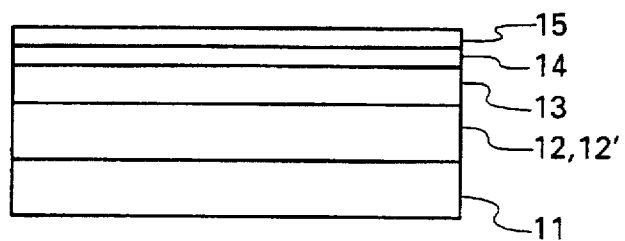
FIG. 1 is a sectional view of a magnetic recording medium according to a first embodiment of the invention, Example 1.

Hereinafter, embodiments of the present invention of the present invention will be described in detail with reference to the drawings. FIG. 1 is a sectional view of one embodiment of a magnetic recording medium of the present invention. In this figure, reference numeral 11 indicates a glass substrate made of a soda lime series glass material; 12 and 12' are non-magnetic underlaying films made of Cr; 13 is a magnetic recording film made of a Co alloy; 14 is a non-magnetic covering film made of C; and 15 is a lubricating film made of perfluoroalkyl polyether. Of these materials, the non-magnetic magnetic underlaying films 12 and 12', magnetic recording film 13, and non-magnetic covering film 14 are all formed by a sputtering method; and the lubricating film 15 is formed by a dipping method. Hereinafter, the detailed construction of the magnetic recording medium will be described in association with a manufacturing method thereof.

According to a first embodiment of the invention, Example 1, a magnetic recording medium was prepared as follows. A glass substrate 11 (outside diameter: 95 mm$\phi$; inside diameter: 25 mm$\phi$; and thickness: 0.8 mm) was subjected to surface polishing up to an average roughness Ra of 1 nm or less, and was further chemically strengthened. After cleaning, a non-magnetic underlaying film 12 made of Cr was formed on the glass substrate 11 to a thickness of 50 nm at room temperature (that is, in the state that the substrate is not heated), an Ar gas pressure of 5 mTorr, and a DC input power of 4 W/cm2. Subsequently, a non-magnetic underlaying film 12' made of Cr was formed to a thickness of 100 nm at a substrate temperature of 200° C. at an Ar gas pressure of 5 mTorr, and a DC input power of 4 W/cm2. A magnetic recording film 13 was then formed using a CoCr12Pt4 alloy to a thickness of 40 nm at an Ar gas pressure of 5 mTorr and an DC input power of 4 W/cm2. After that, in the state that the substrate was not heated, a non-magnetic covering film 14 made of C was formed to a thickness of 15 nm at an Ar gas pressure of 3 mTorr and a DC input power of 3 W/cm2, and a lubricating film 15 was formed by applying a solution of perfluoroalkyl polyether. A magnetic recording medium was thus obtained.

As Comparative Example 1, a magnetic recording medium was obtained in the same manner as described above, except that in place of the non-magnetic underlayer film 12 and the non-magnetic underlaying film 12', only a non-magnetic underlaying film 12 of Cr was formed at one time (one step) to the same total thickness of 150 nm while the substrate was heated to a temperature of 200° C.

Figure 2:
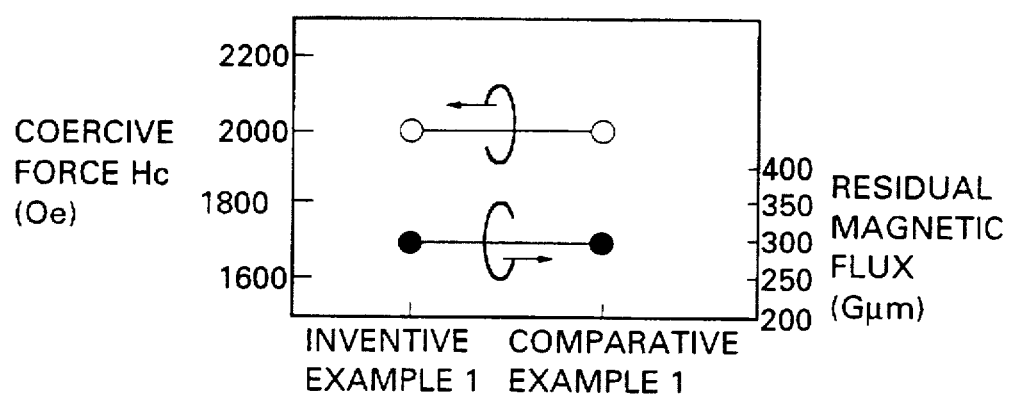
FIG. 2 is a graph showing magnetostatic characteristics of the magnetic recording media of Example 1 of the invention and a Comparative Example 1.

The characteristics of the magnetic recording media Example 1 of the invention and Comparative Example 1 were examined as follows. However, for X-ray diffraction and examination of magnetostatic characteristics, each sample formed with no non-magnetic covering film was separately prepared. Each medium was cut in a size of 7 mm×7 mm, to obtain a sample, and the magnetostatic characteristics of the sample were measured for 20 min/loop at a saturated magnetic field of 10 kOe using a VSM (Vibration Sample Magnetometer). The results are shown in FIG. 2. As is apparent from this figure, each of the samples in Inventive Example 1 and Comparative Example 1 shows the same coercive force Hc of 2000 Oe and residual magnetic flux of 300 G$\mu$m. Incidentally, the graphs of FIGS. 2, 3, 5 and 7 use lines joining the discretely plotted points for each analysis result for the Inventive Examples and Comparative Examples. The lines joining these points are provided to direct the viewer's attention to the appropriate y-axis legend, which is further illustrated by the arcs encircling the lines and accompanying arrows as well as the difference in the representations of the points, i.e. filled versus unfilled circular points.

Figure 3:
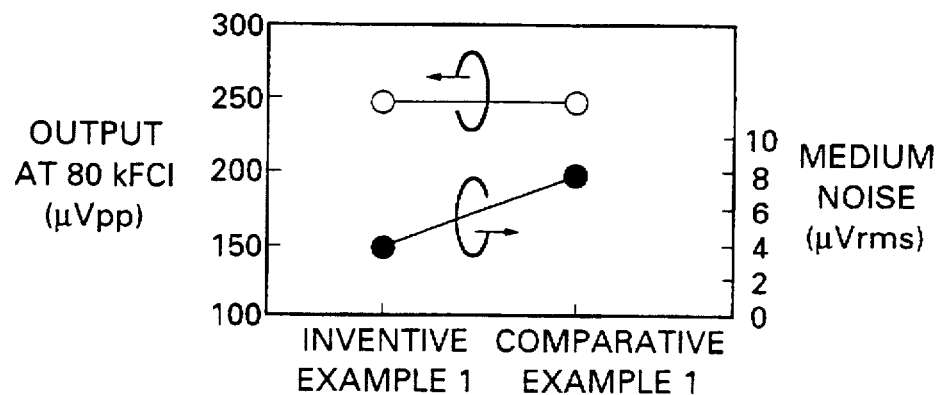
FIG. 3 is a graph showing recording performance characteristics of the magnetic recording media of Example 1 according to the invention and the Comparative Example 1.

The recording performance characteristics of each of these magnetic recording media in Inventive Example 1 and Comparative Example 1 were measured under the conditions of a relative speed of 8 m/s, head floating amount of 50 nm and 80 kFCI using a thin film head (gap length: 0.3 $\mu$m, number of turns of coil: 45 turns, and track width: 5.0 em). The results are shown in FIG. 3. As is apparent from this figure, with respect to the output, each of the samples in Inventive Example 1 and Comparative Example 1 exhibits a value of 250 $\mu$Vpp, that is, these samples are not different from each other. On the contrary, with respect to the medium noise, a large difference is present between the samples in Inventive Example 1 and Comparative Example 1. Namely, the sample in Inventive Example 1 exhibits a value of 4 $\mu$Vrms; while the sample in Comparative Example 1 exhibits a value of 8$\mu$Vrms. Consequently, the medium noise of the sample in Inventive Example 1 is half that of the sample in Comparative Example 1.

Figure 4:
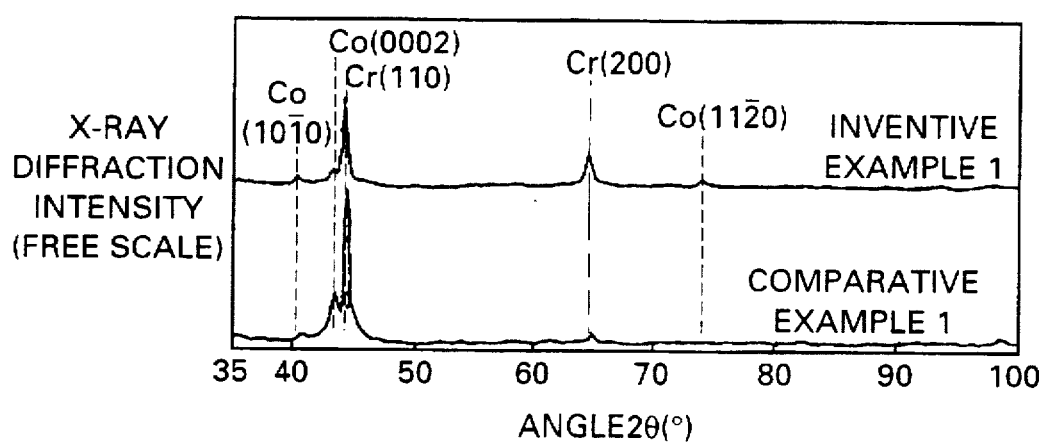
FIG. 4 is a graph showing X-ray diffraction intensities of the magnetic recording media in Example 1 according to the invention and Comparative Example 1.

The magnetic recording films of these samples in Inventive Example 1 and Comparative Example 1 were subjected to crystal structure analysis by X-ray diffraction. The analysis was made under the conditions (tube voltage: 50 kV, tube current: 100 mA, sampling width: 0.040 and scanning rate: 4°/min using a wide angle goniometer. The results are shown in FIG. 4. As shown in this figure, in the sample of Inventive Example 1, the diffraction intensities at the (110) face of Cr and at the (0002) face of Co are very much higher than those in the sample of Comparative Example 1. Moreover, in the sample of Inventive Example 1, the diffraction intensity at the (11$\bar{2}$0) face of Co can barely be observed. In the sample of Inventive Example 1, the diffraction intensity at the (0002) face of Co is about twice the total of the diffraction intensities of the other faces of Co, that is, the (10$\bar{1}$0) face of Co, the (11$\bar{2}$0) face of Co, and the (10$\bar{1}$1) face of Co. Consequently, it is shown that even for the samples having the same coercive force and the residual magnetic flux, the amount of noise generated for each medium of the Examples differs depending on the diffraction intensity of the (0002) face of Co. For the magnetic recording medium using a glass substrate, the medium noise is lowered by increasing the diffraction intensity of the (0002) face of Co. With respect to the grain refining of columnar surface which is the important factor of the magnetic recording film, each of the medium samples of Inventive Example 1 and Comparative Example 1 exhibited the same mean grain size of 35 nm on the magnetic layer by observation using a scanning electron microscope. Additionally, in the sample of Inventive Example 1, the orientation of crystals along the circumferential direction of the medium was observed to be nonexistent.

In the above-described sample of Inventive Example 1, the non-magnetic underlaying film 12' was formed at 200° C. however, even when it was formed at 100° C. 300° C. or 450° C. there was obtained a magnetic recording film in which the diffraction intensity at the (0002) face of Co was 1.5 times or more the total of the diffraction intensities of the other faces of Co, recording medium having such a magnetic recording film was lower in noise than that of the sample of Comparative Example 1.

To obtain excellent longitudinal magnetic characteristics, the non-magnetic underlaying film 12' is preferably formed at a temperature of 100° C. or more. However, when the heating temperature becomes excessively high, an adverse effect is exerted on the recording performance (electromagnetic conversion characteristic), resulting in an increased medium noise. Accordingly, the maximum heating temperature is preferably in the range of 450° C. or less. Under such a condition, there can be obtained a magnetic recording film in which the diffraction intensity of the (0002) face of Co is 1.5 times or more the total of the diffraction intensities of the other faces of Co.

According to a second embodiment of the invention, Inventive Example 2, a magnetic recording medium was prepared as follows. A glass substrate 11 (outside diameter: 65 mmφ; inside diameter: 20 mmφ; and thickness: 0.635 mm) was subjected to surface polishing up to an average (center line average) roughness Ra of 2 nm or less, and was further chemically strengthened. After cleaning, a non-magnetic underlaying film 12 made of Cr was formed on the glass substrate 11 (not heated) to a thickness of 25 nm at an Ar gas pressure of 7 mTorr and a DC input power of 4 W/cm2. Subsequently, a non-magnetic underlaying film 12' made of Cr was formed to a thickness of 25 nm at a substrate temperature of 200° C. at an Ar gas pressure of 7 mTorr, and a DC input power of 4 W/cm2. A magnetic recording film 13 was then formed using a CoCr14Pt6 alloy to a thickness of 45 nm at an Ar gas pressure of 7 mTorr and an DC input power of 4 W/cm2. After that, in the state that the substrate was not heated, a non-magnetic covering film 14 made of C was formed to a thickness of 15 nm at an Ar gas pressure of 3 mTorr and a DC input power of 3 W/cm2, and a lubricating film 15 was formed by applying a solution of perfluoroalkyl polyether. A magnetic recording medium was thus obtained.

For comparison, a magnetic recording medium (Comparative Example 2) was prepared in the same manner as described above, except that in place of the non-magnetic underlayer film 12 and the non-magnetic underlaying film 12', only a non-magnetic underlaying film 12 of Cr was formed on the substrate (not heated) at one time to the same total thickness of 50 nm at the same conditions (Ar gas pressure: 7 mTorr, and DC input power: 4W/cm2); and a magnetic recording medium (Comparative Example 3) was prepared in the same manner as that in Comparative Example 2, except that the non-magnetic underlaying film 12 of Cr was formed at one time on the substrate at a substrate temperature of 450° C.

With respect to magnetostatic characteristics, the sample in Inventive Example 2 exhibited a coercive force of 2300 Oe and a residual magnetic flux of 300 Gμm; the sample in Comparative Example 2 in which the non-magnetic underlaying film was prepared on the substrate (not heated) exhibited a coercive force of 1300 Oe and a residual magnetic flux of 320 Gμm; and the sample in Comparative Example 3 in which the non-magnetic underlaying film was prepared at 450° C. exhibited a coercive force of 2000 Oe and a residual magnetic flux of 300 Gμ.

Figure 5:
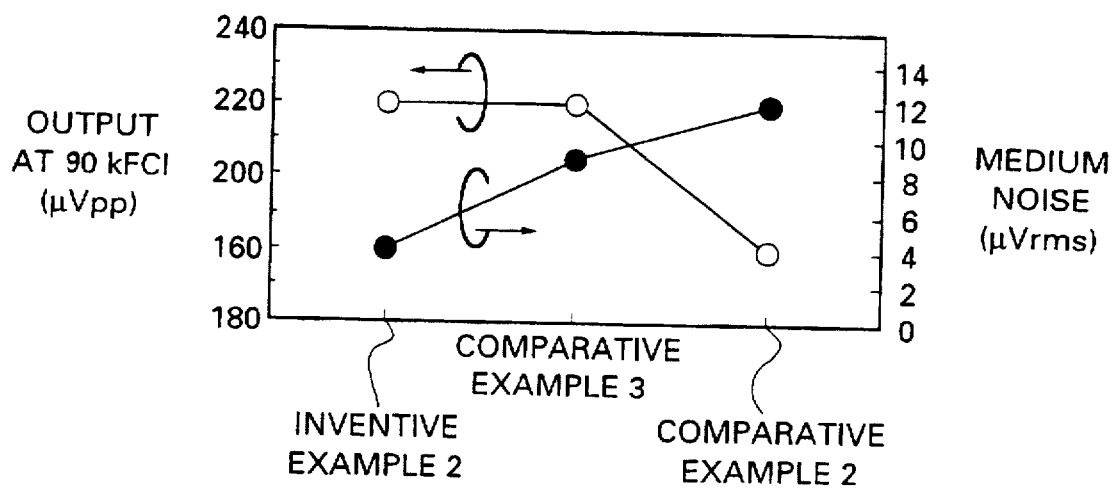
FIG. 5 is a graph showing recording performance characteristics of magnetic recording media of a second embodiment of the invention, Example 2 and also of Comparative Examples 2 and 3.

The recording performance characteristics of each of these magnetic recording media in Inventive Example 2 and Comparative Examples 2 and 3 were measured under the conditions of a relative speed of 8 m/s, head floating amount of 50 nm and 90 kFCI using a thin film head (gap length: 0.3 μm, number of turns of coil: 45 turns, and truck width: 5.0 μm). The results are shown in FIG. 5. As is apparent from this figure, the sample of Comparative Example 3 exhibits an output of 220 μVpp, that is, it is not that much different in output from the sample of Inventive Example 2. The sample of Comparative Example 2 exhibits an output of 180 μVpp, that is, it is different in output from the sample of Inventive Example 2. With respect to the medium noise, a large difference is present between the samples of Inventive Example 2 and Comparative Examples 2 and 3. Specifically, the sample in Inventive Example 1 exhibits a value of 4.5 μVrms; the sample in Comparative Example 3 exhibits a value of 9 μVrms; and the sample in Comparative Example 2 exhibits a value of 12 μVrms. Consequently, the medium noise of the sample in Inventive Example 2 is half that of each of the samples in Comparative Examples 2 and 3.

Figure 6:
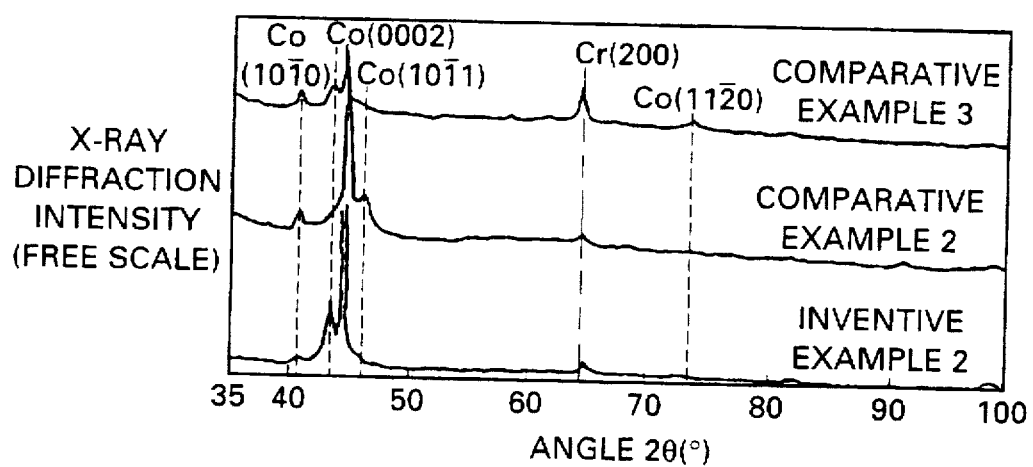
FIG. 6 is a graph showing X-ray diffraction intensities of the magnetic recording media of Example 2 of the invention and Comparative Examples 2 and 3.

FIG. 6 shows the results of X-ray diffraction analysis for the samples of Inventive Example 2 and Comparative Examples 2 and 3. As is apparent from this figure, in the sample of Inventive Example 2, the diffraction intensity (in arbitrary units) at the (0002) face of Co is strongest while the diffraction intensity at the (11$\bar{2}$0) face of Co is barely observed, and the diffraction intensity of the (0002) face of Co is several times the total of the diffraction intensities of the other faces of Co; however, in the sample of Comparative Example 2, the diffraction intensity at the (10$\bar{1}$1) face of Co is strongest while the diffraction intensity at the (0002) face of Co is barely observed. On the other hand, in the sample of Comparative Example 3, the diffraction intensities at the main diffraction faces of Co, that is, the (10$\bar{1}$0) face, (10$\bar{1}$1) face, (11$\bar{2}$0) face and the (0002) face are observed, but they become smaller in the order of the (0002) face, the (10$\bar{1}$0) face, the (11$\bar{2}$0) face and the (10$\bar{1}$1) face. At the same time, the diffraction intensity of the (0002) face is approximately equal to the total of the diffraction intensities of the other faces. Additionally, in the sample of Inventive Example 2, the mean grain size was 32 nm.

According to a third embodiment of the invention, Example 3, a magnetic recording medium was prepared as follows. A glass substrate 11 (outside diameter: 65 mmφ; inside diameter: 20 mmφ; and thickness: 0.889 mm) was subjected to surface polishing up to a center line average roughness Ra of 1.5 nm or less, and was further chemically strengthened. A non-magnetic underlaying film 12 made of Cr was then formed on the glass substrate 11 (not heated) to a thickness of 25 nm at an Ar gas pressure of 5 mTorr and a DC input power of 4 W/cm2. Subsequently, a non-magnetic underlaying film 12' made of Cr was formed to a thickness of 25 nm at a substrate temperature of 200° C. at an Ar gas pressure of 5 mTorr, and a DC input power of 4 W/cm2. A magnetic recording film 13 was then formed using a CoCr14Pt6 alloy twice to a total thickness of 40 nm (20 nm in thickness for each layer) at an Ar gas pressure of 5 mTorr and an DC input power of 4 W/cm2. After that, a non-magnetic covering film 14 and a lubricating film 15 were formed in the same manner as in Example 1. A magnetic recording medium was thus obtained.

Figure 7:
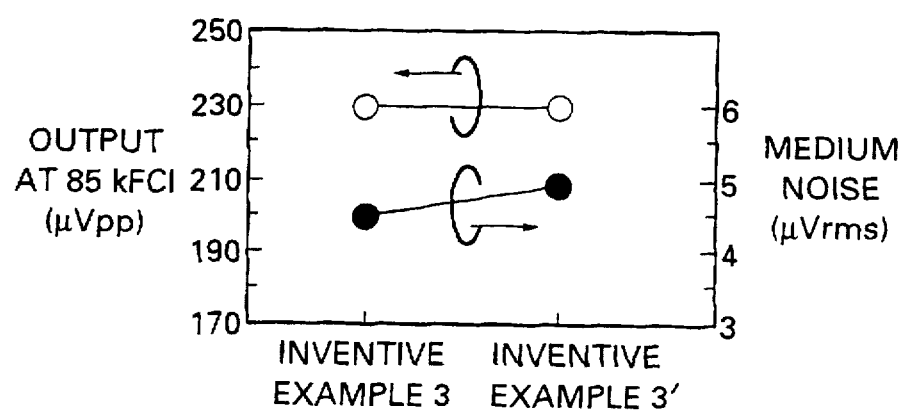
FIG. 7 is a graph showing the recording performance characteristics of magnetic recording media according to a third embodiment of the invention, Example 3 and a Comparative Example 3'.

With respect to magnetostatic characteristics, the medium of Inventive Example 3 exhibited a coercive force of 2400 Oe and a residual magnetic flux of 310 μm. In addition, the sample in which the magnetic recording film 13 was formed at one time (Inventive Example 3') exhibited the same values as described above. The recording performance characteristics of each of these magnetic recording media of Inventive Examples 3 and 3' were measured under the conditions of a relative speed of 8 m/s, head floating amount of 50 nm and 85 kFCI using a thin film head (gap length: 0.3 µm, number of turns of coil: 45 turns, and track width: 5.0 µm). The results are shown in FIG. 7. As is apparent from this figure, with respect to the output, each of the samples of Inventive Examples 3 and 3' exhibits the same value of 230 µVpp. On the other hand, with respect to the medium noise, a slight difference is present between the samples of Inventive Examples 3 and 3'. Namely, the medium sample of Example 3 exhibited a value of 4.5 µVrms; while the medium sample of Example 3' exhibited a value of 4.8 µVrms. Consequently, the medium noise of the sample of Inventive Example 3 is slightly smaller than that of the sample of Inventive Example 3'. As a result of X-ray diffraction analysis, in both the samples, the diffraction intensity at the (0002) face of Co was the strongest while the diffraction intensity at the (11$\bar{2}$0) face of Co was observed to be almost nonexistent. The diffraction intensity of the (0002) face of Co is 2.5 times or more the total of the diffraction intensities of the other faces of Co. However, the diffraction intensity of the (0002) face of Co in the sample of Inventive Example 3' is higher than that of Inventive Example 3. This shows that a multi-layer film causes a slight disturbance in the crystal orientation; but it can be totally reduced in the medium noise due to the strong orientation at the (0002) face of Co and the multi-layer structure of the magnetic recording film.

For the medium sample in which an intermediate film of Cr having a thickness of 2 nm was formed between the magnetic recording films, the medium noise was further reduced up to 4.2 µVrms. The magnetostatic characteristics of the medium of this sample was substantially the same as those in the magnetic recording film having a single layer. The diffraction intensity of the (0002) face of Co was 2.5 times or more the total of the diffraction intensities of the other faces of Co. The mean grain size of the magnetic recording film on the uppermost surface was 30 nm. In addition, the magnetic recording film may be formed of three or more layers, and each intermediate film of Cr may be provided between these layers.

Although the above-described examples have been described using a glass substrate having a diameter of 3.5 or 2.5 inches, the present invention can be applied to substrates having various diameters and thicknesses. Also, in the above-described examples, only soda lime series glass has been used; however, the present invention is not limited only to the glass material having the specified composition according to the preferred embodiments. Other glass materials and ceramics or carbon material may be used, with the same result. Additionally, in the case of using ceramics or carbon material, other than the glass material, a non-magnetic underlaying film made of Cr is preferably provided thereon.

The non-magnetic underlaying film and the non-magnetic intermediate film are not limited to be made of Cr, but may be made of a non-magnetic metal such as a Cr alloy, W or Mo. Even in the case of using such a non-magnetic metal, the low noise can be also obtained. Moreover, each of the non-magnetic underlaying film and the non-magnetic intermediate film may be formed of not only a single layer but also multi-layers.

As described above, in the present invention, there is obtained a magnetic recording medium including a magnetic recording film mainly containing cobalt formed on a glass substrate, wherein with respect to crystal orientation faces, the diffraction intensity (I) of the (0002) face is 1.5 times or more the total of the diffraction intensities of the other orientation faces. That is, the relationship can be expressed as follows.

$$8 \geq ICo(0002) \geq 1.5\{ICo(10\bar{1}0) + ICo(11\bar{2}0) + ICo(10\bar{1}1)\}$$

As a result of the invention, a high density recording medium exhibiting low noise is achieved.

We claim:

1. A magnetic recording medium for longitudinal recording, comprising:
   a non-magnetic substrate made of one of glass ceramics or carbon;
   at least one non-magnetic layer of a material containing Cr on said substrate; and
   a magnetic recording film mainly containing cobalt, which is provided on said non-magnetic layer;
   wherein said magnetic recording film has a crystal orientation with faces of cobalt measured by X-ray diffraction wherein the diffraction intensity of the (0002) face is between 1.5 times and 8 times the total of the diffraction intensities of the (10$\bar{1}$0), (11$\bar{2}$0) and (10$\bar{1}$1) faces, inclusive.

2. A magnetic recording medium according to claim 1, wherein said at least one non-magnetic layer includes a first layer formed on said substrate at ambient temperature and a second layer formed on said first layer at a temperature in a range of 150° C. to 450° C.

3. A magnetic recording medium according to claim 2, wherein each of said first and second layers is in a range from 1 to 100 nm so that a total thickness of said non-magnetic layer is in a range from 1 to 100 nm.

4. A magnetic recording medium for longitudinal recording according to claim 1, wherein crystals on a surface of said magnetic recording film have an average grain size in the range of from 5 to 35 nm.

5. A magnetic recording medium according to claim 1, wherein said magnetic recording film has a thickness in a range of 5 to 70 nm.

6. A magnetic recording medium according to claim 1, wherein said non-magnetic layer includes first and second layers that have a different composition of said material.

7. A magnetic recording medium according to claim 2, wherein said first layer and said second layer is formed of first and second materials, respectively, consisting essentially of at least one of Cr and $CrX_a$, wherein X is selected from the group consisting of Ti, Mo, W, Zr and V, and wherein a is in a range of 1 to 40 At.%.

8. A magnetic recording medium for longitudinal recording according to claim 2, wherein crystals on the surface of said magnetic recording film have an average grain size in the range of from 5 to 35 nm.

9. A magnetic recording medium for longitudinal recording according to claim 3, wherein crystals on the surface of said magnetic recording film have an average grain size in the range of from 5 to 35 nm.

10. A magnetic recording medium according to claim 2, wherein said first and second layers have a different composition of said material.

11. A magnetic recording medium for longitudinal recording, formed by the process of:
    sputtering a first non-magnetic underlaying film on a non-magnetic substrate of glass ceramics or carbon at ambient temperature;
    forming a second non-magnetic underlaying film on said first non-magnetic underlaying film at a temperature in a range of from 100° to 450° C. and
    forming a magnetic recording film on said second non-magnetic underlaying film;
    wherein said magnetic recording film is formed of cobalt and has a crystal orientation with faces of cobalt measured by X-ray diffraction wherein the diffraction intensity of the (0002) face is between 1.5 times and 8 times the total of the diffraction intensities of the (10$\bar{1}$0) an(11$\bar{2}$0) and (10$\bar{1}$1) faces.

12. A magnetic recording medium according to claim 11, wherein said first and second non-magnetic underlaying films are formed of a material consisting essentially of at least one of Cr, CrTi, CrMo, and CrW.

13. A magnetic recording medium according to claim 11, wherein said first and second non-magnetic underlaying films are formed by sputtering and each is in a range of 1 to 100 nm thick.

14. A magnetic recording medium according to claim 11, wherein said crystals have an average grain size in a range from 5 to 35 nm.

15. A magnetic recording medium according to claim 11, wherein said magnetic recording film is 5 to 70 nm thick.

16. A method of manufacturing a magnetic recording medium for longitudinal recording, comprising the steps of:

forming a first non-magnetic underlaying film on a substrate of glass ceramics or carbon by sputtering at ambient temperature;

forming a second non-magnetic underlaying film on said first non-magnetic underlaying film by sputtering while applying heat at a temperature range of 100° to 450° C.; and forming a magnetic recording film on said second non-magnetic underlaying film;

wherein said magnetic recording film is formed of cobalt and has a crystal orientation with faces of cobalt measured by X-ray diffraction wherein the diffraction intensity of the (0002) face is between 1.5 times and 8 times the total of the diffraction intensities of the (10$\bar{1}$0), (11$\bar{2}$0) and (10$\bar{1}$1) faces.

* * * * *